April 8, 1952 H. L. DONLEY 2,591,792

FREQUENCY STABILIZATION OF RADIO FREQUENCY GENERATORS

Filed July 31, 1947

Inventor

Hugh L. Donley

By C. D. Tuska

Attorney

Patented Apr. 8, 1952

2,591,792

UNITED STATES PATENT OFFICE 2,591,792

FREQUENCY STABILIZATION OF RADIO FREQUENCY GENERATORS

Hugh L. Donley, Princeton, N. J., assignor to Radio Corporation of America, a corporation of Delaware Application July 31, 1947, Serial No. 765,213

13 Claims. (Cl. 250—36)

Figures 1, 2, 3, 4, 5, 6, 7:
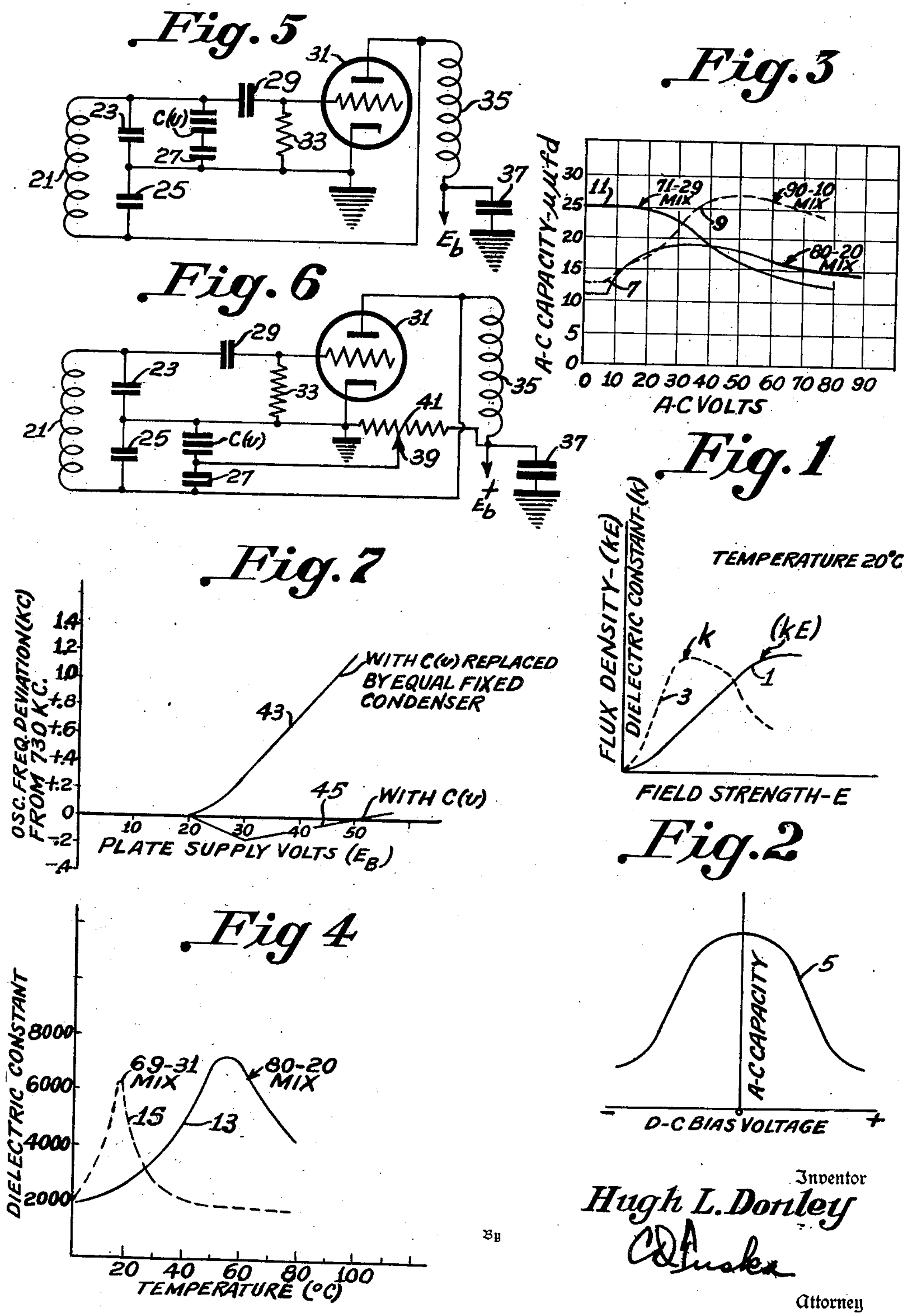

This invention relates generally to thermionic tube oscillator frequency stabilization systems and more particularly to an improved method of and means for frequency stabilization of radio frequency oscillators by utilizing the non-linear dielectric constant characteristic of titanate ceramic elements in response to applied voltages and/or temperature.

In contrast to ordinary dielectrics having medium or low dielectric constant values ($k$), it has been found that titanate ceramics, utilizing mixtures of barium titanate and strontium titanate in predetermined proportions, possess high values of dielectric constant which vary as a function of applied field strength (E). This effect is very pronounced even for very low applied voltages as long as the titanate dielectric is only a few mils thick. The dielectric flux density ($k$E) with respect to the applied field strength (L) provides an operating characteristic in which the dielectric constant ($k$) depends upon the flux density ($k$E), being a maximum value for moderately low values of ($k$E). This operation is somewhat analogous to magnetic B–H characteristics. It is further analogous to the magnetic B–H characteristic in that the alternating current dielectric constant decreases with an increase in direct current field strength and increases with an increase in alternating current flux density.

Consequently, these characteristics of titanate dielectric capacitors permit the utilization of the non-linear relationship between applied voltage and dielectric constant for the purpose of stabilizing the frequency of thermionic tube oscillators, particularly of the Colpitts type. By employing such a non-linear condenser as a circuit element of the tuned circuit of such an oscillator, it is possible to stabilize the oscillator frequency against supply voltage variations or changes in oscillator amplitude, since the resonant frequency of the tuned circuit will depend upon the amplitude of oscillation of the applied voltage. Since the frequency of oscillation of a Colpitts oscillator is above the resonant frequency of the tuned circuit, as the plate supply voltage increases, the resultant frequency of oscillation will increase resulting in the equivalent of a decrease in tuning capacity for the increased plate supply voltage. This equivalent capacity decrease with increased plate supply voltage may be compensated for by utilizing a non-linear titanate capacitor having a rising capacity vs. voltage characteristic. The titanate capacitor should be selected to provide the proper percentage of the total tuning capacity. Since in general, oscillator frequency stability is adversely affected by harmonic generation, the non-linear capacity element should be as small a percentage of the total tuning capacity as will provide the desired frequency stabilization.

Among the objects of the invention are to provide improved methods of and means for stabilizing the frequency of oscillation of thermionic tube oscillators. Another object is to provide improved methods of and means for stabilizing the resonant frequency of a tuned circuit utilized for determining the frequency of a radio frequency generator. An additional object is to provide improved methods of and means for employing titanate dielectric capacitive elements as frequency stabilizing devices to compensate for variations in applied voltage or operating temperature. A still further object of the invention is to provide improved methods of and means for utilizing titanate dielectric capacitive elements for stabilizing the frequency of a thermionic tube oscillator in response to variations in operating alternating and/or unidirectional potentials applied to the titanate element. Another object of the invention is to provide improved methods of and means for employing titanate dielectric capacitive devices as elements in the frequency determining circuit of thermionic tube oscillators for compensating for variations in oscillator frequency, oscillator amplitude and/or applied operating potentials.

The invention will be described in greater detail by reference to the accompanying drawing in which Figures 1, 2, 3 and 4 are graphs indicative of the variations in electrical characteristics of titanate devices as functions of their operating parameters; Figure 5 is a schematic circuit diagram of a first embodiment of the invention; Figure 6 is a schematic circuit diagram of a second embodiment of the invention; and Figure 7 is a pair of graphs illustrating the operating characteristics of the aforementioned embodiments of the invention. Similar reference characters are applied to similar elements throughout the drawing.

Figure 1 comprises a pair of graphs illustrative of the electrical operating characteristics of a typical non-linear titanate capacitor utilizing a ceramic titanate dielectric comprising 80 percent barium titanate and 20 percent strontium titanate. The solid line graph 1 and the dash line graph 3 represent respectively the variations in flux density ($k$E) and dielectric constant ($k$) as functions of applied field strength (E).

The graph 5 of Figure 2 illustrates the variation in capacity of such a non-linear capacitor as a function of applied unidirectional potential to the capacitor electrodes.

Figure 3 illustrates the variations in capacity, as a function of applied alternating potential, for a plurality of titanate capacitor elements utilizing different mixtures of barium-titanate and strontium titanate. The solid line graph 7 is indicative of the variation in capacity as a function of applied alternating potential for a mixture of 80 percent barium titanate and 20 percent strontium titanate. The dash line graph 9 is indicative of the variation in capacity as a function of applied alternating potential for a non-linear titanate capacitor utilizing a mixture of 90 percent barium titanate and 10 percent strontium titanate. Likewise, the broken line graph 11 is characteristic of the variation in capacity as a function of applied alternating potential for a capacitor having a dielectric comprising a mixture of 71 percent barium titanate and 29 percent strontium titanate. Consideration of the graphs 7, 9 and 11 indicates that the desired slope of the capacity variation curve as a function of applied voltage may be selected by utilizing the appropriate mixture of barium titanate and strontium titanate.

Figure 4 is a series of graphs illustrative of the variation in dielectric constant ($k$) as a function of operating temperature in degrees C. The solid line graph 13 indicates the dielectric constant variation with temperature for a titanate capacitor utilizing a mixture of 80 percent barium titanate and 20 percent strontium titanate. The dash line graph 15 illustrates the vastly different relation between dielectric constant and operating temperature for a non-linear titanate capacitor utilizing a mixture of 69 percent barium titanate and 31 percent strontium titanate. By proper selection of the appropriate titanate mixture the desired temperature coefficient characteristics may be selected for any desired operating temperature or temperature range. By proper selection of the mixture of barium titanate and strontium titanate as a function of desired operating temperature, actuating potentials, applied unidirectional bias voltages, and thickness of the titanate dielectric, widely differing electrical characteristics may be obtained to provide the desired type of operation in a particular circuit under consideration.

The invention will be described, by way of illustration, by reference to the application of a titanate capacitor element for the frequency stabilization of a Colpitts oscillator as shown in Figure 5. The oscillator tank circuit includes an inductor 21 shunted by a series capacitor combination comprising capacitors 23, 25. The titanate capacitor element $C(v)$ is connected in series with a third capacitor 27, and the elements $C(v)$ and 27 are connected in shunt with the tuning capacitor 23. One terminal of the inductor 21 and the capacitor 23 and titanate capacitor $C(v)$ are connected through a series grid capacitor 29 to the control electrode of the oscillator tube 31 which is illustrated as a triode. Any other type of multi-electrode tube may be substituted for the triode illustrated. The remaining terminal of the tuning capacitor 23 and the series capacitor 27 are connected to the cathode of the oscillator tube. The cathode is grounded, and is connected to the negative terminal of the anode voltage source $E_b$. A grid leak resistor 33 is connected between the grid and cathode of the tube. The remaining terminals of the tuning inductor 21 and tuning capacitor 25 are connected to the anode of the oscillator tube. The positive terminal of the source of anode potential $E_b$ is connected through a radio frequency choke coil 35 to the anode for supplying operating potential to the circuit. A by-pass capacitor 37 may be connected between the positive terminal of the anode voltage supply and ground.

The circuit of Figure 6 is similar in all respects to that described heretofore with reference to Figure 5 with the exception that the titanate capacitor element $C(v)$ and its series capacitor 27 are connected across the tuning capacitor 25 in the anode-cathode portion of the oscillator circuit instead of across the tuning capacitor 23 in the grid-cathode portion of the oscillator circuit. Also the common terminals of the titanate capacitor $C(v)$ and its series capacitor 27 are connected to the movable contact 39 of a potentiometer or voltage divider 41 which is connected between the positive terminal of the anode voltage supply $E_b$ and ground. Adjustment of the movable contact 39 of the potentiometer 41 provides any desired unidirectional bias voltage for the titanate capacitor element.

In the circuits of Figures 5 and 6, the capacitor 27 connected in series with the titanate capacitor element $C(v)$ provides means for controlling the amount of oscillator radio frequency voltage applied to the titanate capacitor element as well as means for determining the amount of control of the titanate capacitor upon the oscillator tank circuit. As explained heretofore, harmonic generation due to non-linearity in the titanate capacitor element tends to provide frequency instability of the generated oscillations. Therefore, the value of the series capacitor 27 should be selected so that the coupling between the tuned circuit and the titanate capacitor element is sufficient to provide the desired frequency stabilization but is below the value providing saturation of the titanate capacitor element.

In the circuit of Figure 6, the D.-C. bias applied to the titanate capacitor element by adjustment of the potentiometer contact 39 permits adjustment of the operating parameters of the circuit as indicated in the graphs. It should be emphasized however that the radio frequency capacity of the titanate element decreases as the D.-C. bias is increased. In accordance with the information which may be derived from the graphs, the proper barium-strontium titanate mix should be selected to provide the desired capacity characteristic at the selected operating temperature and with the desired operating A.-C. and D.-C. potentials applied to the titanate element. It should be understood that the titanate element may be included in the oscillatory circuit of any other type of known thermionic tube oscillator in a manner whereby the variation in dielectric constant of the titanate element provides the desired type and degree of capacity variation to accomplish frequency stabilization.

Figure 7 illustrates the variation in operating frequency of an oscillator tuned to 730 kc. with variation in the applied anode voltage. Graph 43 illustrates the variation in oscillator frequency in the circuit of Figure 5 when the titanate element $C(v)$ is replaced by an equivalent fixed capacitor. Graph 45 illustrates the effective frequency stabilization of the same circuit when the titanate element C(v) is employed as described heretofore. In this particular instance the titanate capacitor C(v) comprises about 10 percent of the total tuning capacity. About five volts of radio frequency signal is applied to the titanate capacitor at an operating anode potential of twenty volts. Reference to the graphs of Figures 1 to 4 indicates that a titanate capacitor providing the control indicated in the graphs of Figure 7 may be selected to have a relatively low temperature coeffcient of capacity at room temperature (20° C.), as well as a rapid change in capacity as a function of applied A.-C. or D.-C. voltage at this temperature.

Thus effective frequency stabilization is accomplished to compensate for relatively wide variations in operating temperature and applied oscillator potentials. Titanate dielectric capacitors may be included as elements in the frequency determining tuned circuits of any known types of thermionic tube oscillators wherein the variation in capacity of the titanate element provides a compensating tuning adjustment for other variable circuit parameters.

I claim as my invention:

1. A network for stabilizing the frequency of a thermionic tube oscillator normally responsive to variations in energizing potentials, said oscillator including a resonant circuit, said network including a capacitive device having a ceramic titanate dielectric, said device having a capacitance directly responsive to variations in said energizing potentials, and means for coupling said device in shunt with a portion of said resonant circuit to compensate for said frequency variations.

2. A frequency stabilized oscillator of the type having an oscillation frequency which normally increases with an increase in energizing voltage, said oscillator including a parallel resonant circuit, a capacitive device having a ceramic titanate dielectric, said device having a capacitance directly responsive to variations in said energizing voltage, and means connecting said device in shunt with a portion of said parallel resonant circuit to compensate for variations in said oscillator frequency in response to the energizing voltage variations.

3. A frequency stabilizing network for a thermionic discharge tube oscillator, said oscillator including a resonant circuit and being of the type normally providing a higher output frequency than the resonant frequency of said resonant circuit and in which said output frequency increases as a direct function of oscillator energizing voltage, said network including a capacitive device having a ceramic titanate dielectric, said device having a capacitance directly responsive to variations in said energizing voltage, and means for connecting said device in shunt with a portion of said resonant circuit to compensate for variations in said energizing voltage.

4. A frequency stabilizing network for a thermionic discharge tube oscillator, said oscillator including a resonant circuit and being of the type normally providing a higher output frequency than the resonant frequency of said resonant circuit and in which said output frequency increases as a direct function of oscillator energizing voltage, said network including a capacitive device having a ceramic titanate dielectric, said device having a capacitance directly responsive to variations in said energizing voltage, and adjustable means for connecting said device in shunt with a portion of said resonant circuit to compensate for said variations.

5. A frequency stabilizing network for a thermionic discharge tube oscillator, said oscillator including a resonant circuit and being of the type normally providing a higher output frequency than the resonant frequency of said resonant circuit and in which said output frequency increases as a direct function of oscillator energizing voltage, said network including a capacitive device having a ceramic titanate dielectric, said device having a capacitance directly responsive to variations in said energizing voltage, and adjustable series capacitive means for connecting said device in shunt with a portion of said resonant circuit to compensate for said variations.

6. A frequency stabilized thermionic discharge tube oscillator having a resonant circuit including an inductor and a pair of serially-connected capacitors connected in shunt with said inductor, a thermionic discharge tube having an anode, a cathode and a control electrode, means coupling said anode to one terminal of said inductor, means coupling said control electrode to the remaining terminal of said inductor, means coupling said cathode to the common terminal of said capacitors, connections for a source of energizing potentials for said tube, a capacitive device having a ceramic titanate dielectric, and means coupling said device in shunt with one of said capacitors to stabilize the frequency of said oscillator to compensate for variations in said energizing potentials.

7. A frequency stabilized thermionic discharge tube oscillator having a resonant circuit including an inductor and a pair of serially-connected capacitors connected in shunt with said inductor, a thermionic discharge tube having an anode, a cathode and a control electrode, means coupling said anode to one terminal of said inductor, means coupling said control electrode to the remaining terminal of said inductor, means coupling said cathode to the common terminal of said capacitors, connections for a source of energizing potentials for said tube, a capacitive device having a ceramic titanate dielectric, and a series coupling capacitor coupling said device in shunt with one of said capacitors to stabilize the frequency of said oscillator to compensate for variations in said energizing potentials.

8. A frequency stabilized thermionic discharge tube oscillator having a resonant circuit including an inductor and a pair of serially-connected capacitors connected in shunt with said inductor, a thermionic discharge tube having an anode, a cathode and a control electrode, means coupling said anode to one terminal of said inductor, means coupling said control electrode to the remaining terminal of said inductor, means coupling said cathode to the common terminal of said capacitors, connections for a source of energizing potentials for said tube, a capacitive device having a ceramic titanate dielectric, and means coupling said device in shunt with said control electrode and cathode to stabilize the frequency of said oscillator to compensate for variations in said energizing potentials 9. A frequency stabilized thermionic discharge tube oscillator having a resonant circuit including an inductor and a pair of serially-connected capacitors connected in shunt with said inductor, a thermionic discharge tube having an anode, a cathode and a control electrode, means coupling said anode to one terminal of said inductor, means coupling said control electrode to the remaining terminal of said inductor, means coupling said cathode to the common terminal of said capacitors, connections for a source of energizing potentials for said tubes, a capacitive device having a ceramic titanate dielectric, and means coupling said device in shunt with said anode and cathode to stabilize the frequency of said oscillator to compensate for variations in said energizing potentials.

10. A frequency stabilized thermionic discharge tube oscillator of the "Colpitts" type having a resonant circuit including an inductor and a pair of serially-connected capacitors connected in shunt with said inductor, a thermionic discharge tube having an anode, a cathode and a control electrode, means coupling said anode to one terminal of said inductor, means coupling said control electrode to the remaining terminal of said inductor, means coupling said cathode to the common terminal of said capacitors, connections for a source of energizing potentials for said tube, a capacitive device having a ceramic titanate dielectric, means coupling said device in shunt with one of said capacitors to stabilize the frequency of said oscillator to compensate for variations in said energizing potentials, and means for applying a unidirectional bias voltage to said device.

11. A frequency stabilized thermionic discharge tube oscillator of the "Colpitts" type having a resonant circuit including an inductor and a pair of serially-connected capacitors connected in shunt with said inductor, a thermionic discharge tube having an anode, a cathode and a control electrode, means coupling said anode to one terminal of said inductor, means coupling said control electrode to the remaining terminal of said inductor, means coupling said cathode to the common terminal of said capacitors, connections for a source of energizing potentials for said tube, a capacitive device having a ceramic titanate dielectric, means coupling said device in shunt with one of said capacitors to stabilize the frequency of said oscillator to compensate for variations in said energizing potentials, and means responsive to said energizing potentials for applying a unidirectional bias voltage to said device 12. A frequency stabilizing network for an oscillator including a resonant circuit comprising a parallel arrangement of an inductor and a pair of serially connected capacitors and being of the type normally providing a higher output frequency than the resonant frequency of said resonant circuit and in which said output frequency increases as a direct function of oscillator energizing voltage, said network including a capacitive device having a ceramic titanate dielectric, means for connecting said device in parallel with a portion of said resonant circuit to compensate for variations in said energizing voltage, and means for applying a unidirectional bias voltage to said device 13. A network for stabilizing the frequency of a thermionic tube oscillator including a resonant circuit and of the type normally responsive to variations in energizing potentials, said resonant circuit including an inductor and a pair of series connected capacitors, said inductor and said capacitors being connected in parallel, said network including a capacitive device having a ceramic titanate dielectric, said device having a capacitance directly responsive to variations in said energizing potentials, and means for coupling said device in shunt with one of said pair of capacitors to compensate for said frequency variations.

HUGH L. DONLEY.

REFERENCES CITED

The following references are of record in the file of this patent:

UNITED STATES PATENTS

| Number | Name | Date |
|---|---|---|
| 1,976,570 | Llewellyn | Oct. 9, 1934 |
| 2,019,765 | Osnos | Nov. 5, 1935 |
| 2,420,692 | Wainer | May 20, 1947 |

OTHER REFERENCES

Wul, B. M.: Dielectric Constant of Barium Titanate as a Function of Strength of an Alternating Field, Comptes Rendus (Doklady), October 30, 1945, vol. 49, No. 3, pages 177–180.